Nov. 6, 1962 O. H. FERNALD ETAL 3,062,914

ELECTRON DISCHARGE DEVICE CIRCUITS

Filed April 15, 1959 2 Sheets-Sheet 1

WITNESSES:

Bernard R. Gieguey

James F. Young

INVENTORS

Charles B. Heffron and

Olaf H. Fernald.

BY Benjamin DeWitt

ATTORNEY

ELECTRON DISCHARGE DEVICE CIRCUITS

Filed April 15, 1959

2 Sheets-Sheet 2

United States Patent Office 3,062,914
Patented Nov. 6, 1962

3,062,914

ELECTRON DISCHARGE DEVICE CIRCUITS

Olaf H. Fernald, East Brunswick, and Charles B. Heffron, Metuchen, N.J., assignors to Westinghouse Electric Corporation, East Pittsburgh, Pa., a corporation of Pennsylvania Filed Apr. 15, 1959, Ser. No. 806,494
8 Claims. (Cl. 178—5.4)

Figure 1:
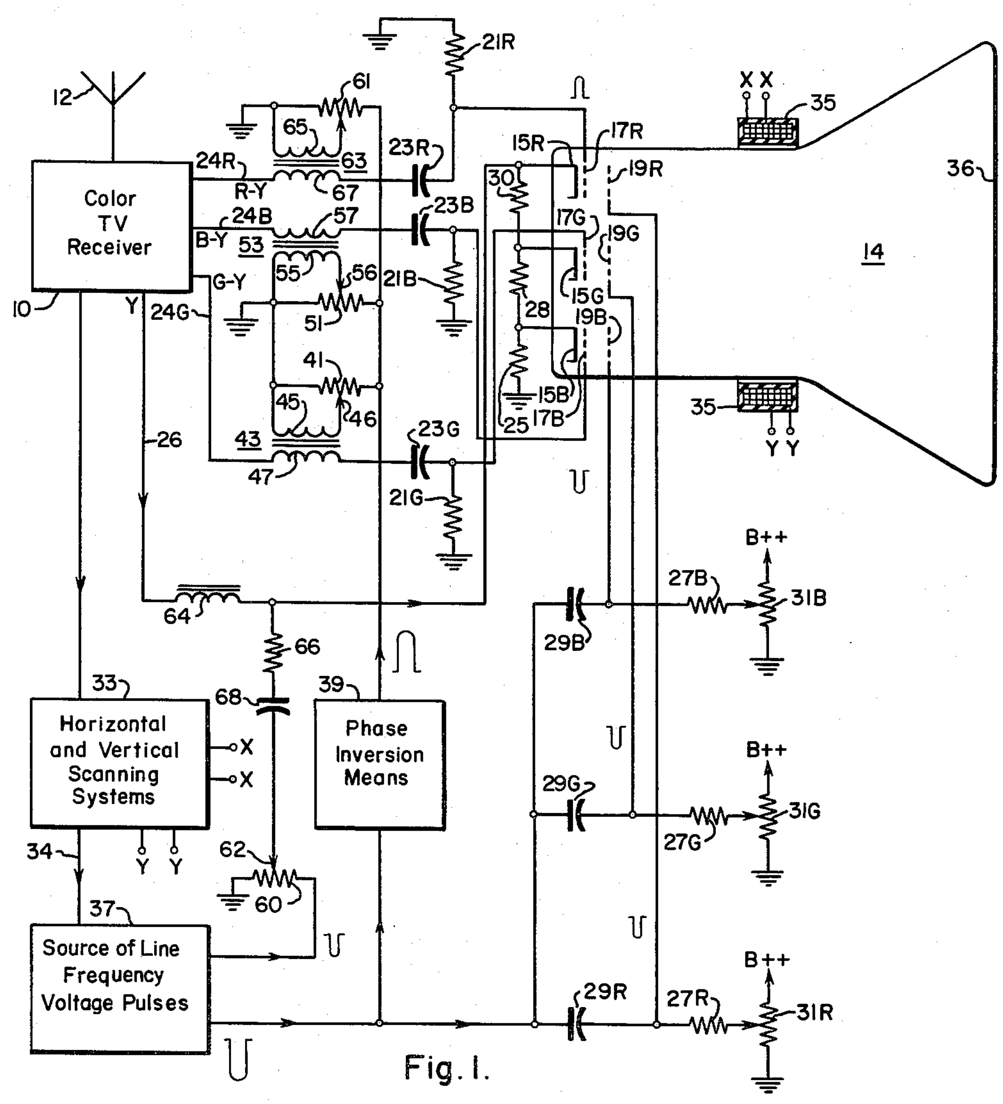

This invention relates to novel circuit arrangements for cathode ray producing discharge devices and more particularly to circuit arrangements for stabilizing the average electron discharge current of a first such device relative to the same current of one or more other such devices.

The present invention may find application in any apparatus wherein the cathode ray beams produced by two or more electron emissive devices are combined to supply energy to a common load or otherwise cooperate to produce a single result in response to the combined electron currents thereof.

Our invention will be illustrated in connection with a color-television receiver incorporating an image reproducing system of the type which includes a plurality of cathode-ray producing electron guns. However, it is to be understood that our invention is in no way limited to the illustrated application, but may be used in any of various circuit arrangements wherein a plurality of cathode ray-producing electron guns co-act in a manner such that it is desirable to maintain predetermined relations between the average discharge currents flowing from them.

In a form of color-television system more completely described in an article in "Electronics" for February 1952 entitled "Principles of NTSC Compatible Color Television" at pages 88–95, inclusive, information representative of a scene being televised in color is utilized to develop at the transmitter two substantially simultaneous signals one of which is primarily representative of scene brightness or luminance and the other of which is representative of the chromaticity of the image. These signals are combined to form a composite video-frequency signal in a manner more fully described in such article and the composite signal is utilized to modulate a conventional radio-frequency carrier-wave. A receiver in such system intercepts the radio-frequency signal and derives the composite video-frequency signal therefrom. The receiver includes a pair of channels for applying the brightness and chrominance information to an image-reproducing device. The channel for translating the brightness signal is substantially the same as the video-frequency amplifier portion of a conventional monochrome receiver. The chrominance signal is translated through the second of such channels and three separate color-signal components individually representative of the three primary colors red, green and blue of the image are derived therefrom and are combined with the brightness signal in the image-reproducing device to effect reproduction of the televised color image.

One form of image-reproducing device used in such receivers includes a cathode-ray tube having three electron guns, the three color-signal components being individually applied to different ones of the guns while the brightness signal is applied simultaneously to each of the guns. The electron beams emitted from the three guns are utilized individually to excite different ones of three phosphors which effectively develop three primary color images, such images being optically combined to reproduce the televised image. When the color-television receiver is being utilized for its primary purpose, that is to reproduce color images, the combined primary color images reproduce such color images. However, such receiver is a compatible receiver in that it is capable of reproducing not only the aforementioned color images but also conventional black-and-white images if conventional monochrome signals are received and applied to the cathode-ray tube. In order to reproduce such black-and-white images, the beams emitted by the three electron guns should be so controlled in relative intensities that the three primary color images developed by such beams have relative brightnesses which combine throughout the brightness range of the monochrome image to reproduce the monochrome image. Similar relative intensities of the beams should also be developed to reproduce a correct color image with proper proportions of the primary colors when color signals are being utilized.

In order to control an image-reproducing device such as described above to reproduce monochrome images when monochrome signals are being utilized, the biasing potentials on the control electrodes or first grids in each of the electron guns are adjusted relative to each other so that when a signal representative of a dark shade of gray is applied to each thereof the color images developed by the electron beams emitted from such guns combine to represent such dark shade of gray. This adjustment establishes what is conventionally designated as the "black level" for the three guns and determines the proper biases for the black extremity of the brightness range of the image-reproducing device. In addition, sequential adjustment is made to provide black and white balance for all degrees of brightness. More specifically, the grid biasing potentials are adjusted relative to each other so that a video signal representative of a dark shade of gray applied to the picture tube will appear as a dark shade of gray. The screen potentials are then adjusted so that a signal representative of a high-light appears as the proper color. The grid biases are then readjusted followed by a readjustment of the screen voltages until proper black and white balance is established for all shades of gray.

In cathode-ray beam forming electron guns of the type commonly used in multiple beam color image-reproducing systems, the cathode electrodes of the guns are generally coated with a low work function oxide which has an appreciable resistance. In addition, the interface layer between the oxide coating and the base metal of the cathode may have a significant resistance and usually has a capacitance of the order of .001 microfarad.

The composite internal impedance of the cathode as comprised by the foregoing resistances and reactances, among others, may change from time-to-time depending upon various conditions. For example, it has been found that the cathode impedance may vary as a non-linear function of anode voltage, as a function of cathode temperature and as a complex function of time depending upon past history of the cathode. The bias potential present between the control electrode and the emitting surface of the cathode of such a cathode ray gun is affected by the voltage drop in the cathode impedance due to flow of cathode ray beam current therethrough. That is, the cathode internal impedance effectively is connected in series between the cathode emitting surface and the cathode terminal of the tube; hence with a fixed negative bias applied to the control electrode, anode current flowing through the cathode impedance will create a voltage drop which adds to the fixed bias. The resulting bias appearing between the control electrode and the cathode emitting surface of each electron gun may vary with temperature, age, and other factors.

Accordingly, beam current balance among the guns of a multi-beam image reproducing system is subject to differential drifts which produce undesirable changes in black and white balance as well as in color saturation balance.

Similarly, in any apparatus wherein at least two electron beam forming discharge devices are operated with preferably balanced zero-signal anode currents, changes in the internal cathode impedances may produce differential drifts in the anode currents thereby creating undesirable conditions in the output of the apparatus.

It is, therefore, one object of the present invention to provide a new and improved image reproducing system for color television receivers which does not have the disadvantages of prior such systems.

It is a further object of the present invention to provide stabilization of the control electrode to cathode-surface bias potential applied to one electron beam forming electron gun in a multi-gun cathode ray tube utilizing a plurality of such electron guns in balanced circuit arrangement.

It is an additional object of the present invention to provide automatic means for adjusting the bias potential applied to a cathode ray tube to compensate for changes in the electrical characteristics of the electron guns therein.

It is another object of this invention to provide an inexpensive means for improving the quality of color and black and white television reproduction by maintaining full D.C. transmission of both the chrominance and the luminance signals.

It is another object of this invention to provide a means for adjusting brightness in a color television receiver without disturbing black and white balance, which means provides for complete transmission of direct current components of image signals to the image reproducing device.

It is a different object to provide a color image reproducing system for television apparatus which includes means to prevent changes in black and white balance arising from differential drift in the internal impedances of the cathodes of a plurality of cathode-ray producing electron guns.

Figure 2:
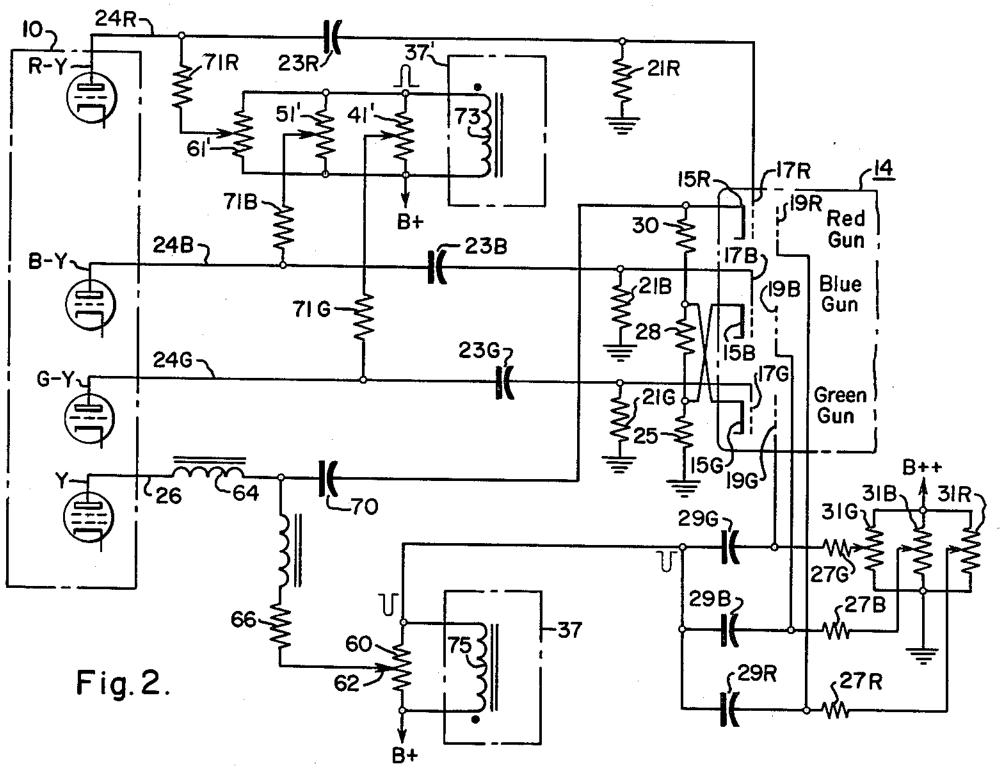
Figure 3:
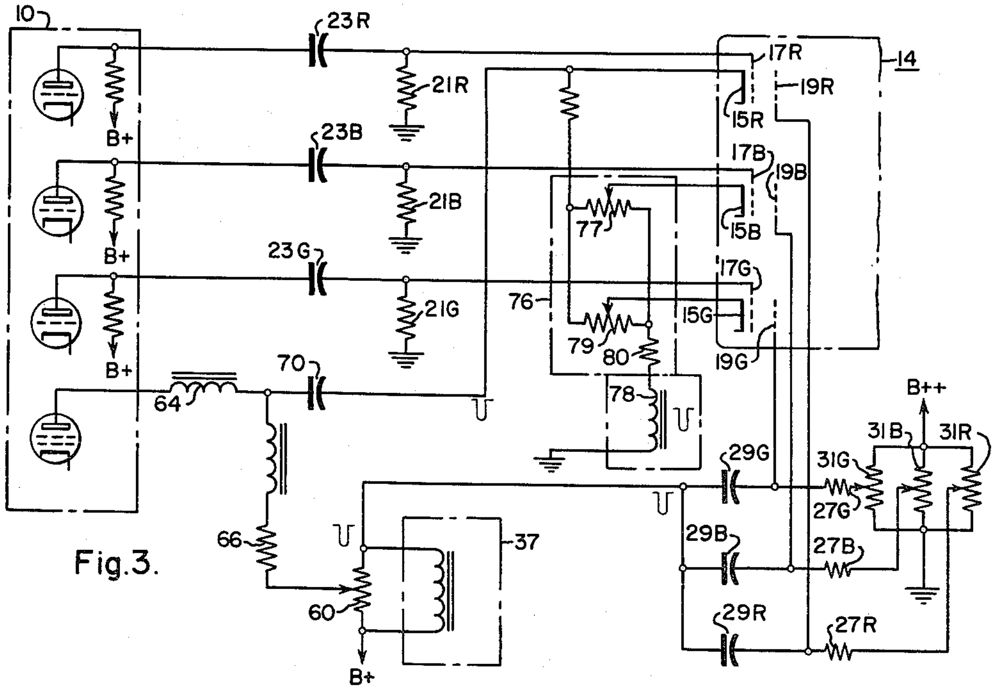

These and other objects will become apparent from the following detailed description when taken in conjunction with the accompanying drawing in which:

FIGURE 1 is a circuit diagram, partially schematic, of a color television receiver including an image reproducing system which incorporates a circuit arrangement in accordance with the present invention, FIG. 2 illustrates a second embodiment of a circuit arrangement in accordance with the present invention, and FIG. 3 illustrates a third and different embodiment of an image reproducing system, utilizing the invention.

Referring now to FIG. 1 of the drawing, there is shown a color television receiver 10 adapted to receive and translate composite television signals which are intercepted by an antenna 12. The television signals normally include a monochrome intelligence component, a synchronizing signal component and a plurality of chromaticity intelligence components. Since the precise form of the signals and the signal receiving circuits may be in accordance with any of various known conventions, it is sufficient to note that the receiver 10 provides, at its output conductors 24R, 24B and 24G, a plurality of video signals representative respectively of the instantaneous intensity of the red, blue and green color difference components of the televised subject. It should be understood that the signal receiver 10, in accordance with conventional practice, may include an RF amplifier, a conventional oscillator and mixer, an IF amplifier, a plurality of synchronous demodulators for individually deriving the different color difference signals and separately supplying them to the output conductors 24. In addition, the receiver 10 includes the usual circuitry for separating out a video signal Y representative of the monochrome portion of the televised signal and for separating out the synchronizing signal components and supplying them to a conventional scanning system 33.

Connected to the receiver 10 by way of the conductors 24R, 24G, 24B and 26, is an image reproducing system in accordance with the present invention including an image reproducing cathode ray tube 14 having three cathode ray producing electron guns. It should be understood that other suitable types of television image reproducing devices or systems having a plurality of electron guns either enclosed in a single cathode ray tube or individually enclosed in separate cathode ray tubes may be employed.

The single cathode ray tube 14 shown by way of example is provided with an electromagnetic deflection yoke 35 having a pair of terminals X—X for application of horizontal deflection or line scanning signals and a second pair of terminals Y—Y for application of vertical deflection or field scanning deflection signals. Such signals are supplied to the said terminals from a conventional horizontal and vertical scanning system 33 having output terminals X—X and Y—Y. In addition to producing the appropriate scanning signals, unit 33 applies synchronizing pulses, by way of conductor 34, to a source of line frequency voltage pulses 37 for generating voltage pulses having a repetition frequency corresponding to the line scanning rate of the beam deflection system 33. In a commercial embodiment of the invention pulse source 37 may comprise one or more auxiliary windings on the horizontal scanning transformer of unit 33.

The cathode ray tube 14 is provided with three electron guns each having a cathode 15, a control electrode 17 and a screen electrode 19. The circuits associated with the electron guns for developing the signals representative of the different primary colors and for applying such signals to different ones of the electron guns are similar in many respects. Hereinfater, similar elements will be designated by the same reference numerals with the suffixes R, G or B indicating that such elements are respectively elements of the channels for translating the red, green and blue color signals. For example, the cathode of the red color signal responsive gun is designated 15R. The cathode of the blue color gun is designated 15B and the cathode of the green color gun is designated 15G. The red color difference signal, R—Y, from receiver 10 is applied by way of conductor 24R and through coupling capacitor 23R to the control electrode 17R of the red gun. A grid resistor 21R is connected from the control electrode 17R to ground or to a point of reference potential, thereby providing a ground return for discharge current flowing to the control electrode 17R. The blue color difference signal, B—Y, is applied by way of conductor 24B and secondary winding 57 of transformer 53 through coupling capacitor 23B to the control electrode 17B of the blue gun. A resistor 21B is connected from the control electrode 17B to ground and provides a ground return path for electron discharge currents flowing from the cathode 15B to the control electrode 17B. Such currents develop a potential across the resistor 21B to regulate the bias voltage on control electrode 17B in a manner to be hereinafter described. Similarly, the green color difference signal from receiver 10 is applied to the control electrode 17G of the green gun by way of secondary winding 47 of transformer 43 and coupling capacitor 23G. A bias resistor 21G corresponding to the aforedescribed resistor 21B is connected from control electrode 17G to ground.

The electron emissive cathodes 15R, 15G and 15B of the three electron guns are supplied with the monochrome signal component Y by way of conductor 26. Serially connected resistors 25, 28 and 30 connected from conductor 26 and cathode 15R to ground provide a voltage divider network for applying appropriate amounts of the monochrome signal to the respective cathodes.

Brightness control is obtained by application of variable pulse magnitudes to the cathodes of the three guns. More specifically, a brightness control potentiometer 60 is connected from one output of the pulse source 37 to ground. The variable tap 62 of potentiometer 60 is connected to the cathodes 15R, 15B and 15G through a pulse coupling and video blocking network including resistor 66 and capacitor 68. Average brightness of the picture, whether monochrome or color, may be adjusted by adjustment of potentiometer 60. For example, when adjustable tap 62 is shifted to the right on potentiometer 60, the magnitude of the negative pulses transmitted to cathodes 15R, 15B and 15G will be increased thereby increasing the grid current pulses during the retrace intervals. Increased grid current pulses result in increased average D.C. bias voltage across resistors 21R, G and B so that the electron beam intensities are reduced to reduce the picture brightness.

There are some inherent advantages with this type of brightness control. One is that since the stabilization pulses occur during the horizontal line retrace interval of the luminance signal the bias level and hence brightness level is keyed to the sync tip level (held constant in transmission) and the reference black level setting of the picture tube therefore is held constant and full D.C. transmission is obtained. This is applicable to both black and white and color receiver systems. This arrangement also allows for operation of the cathode D.C. potential much closer to ground reference voltage. Thus, the absolute magnitude of the available screen voltage is increased, easing design and cost.

Further, since the stabilization pulse occurs when there is zero signal output from the color demodulators (assuming burst blanking has been used) the full D.C. transmission in chroma is achieved. This all adds to the quality of picture reproduction.

Blanking of the cathode ray tube 14 during the retrace portions of the line scanning deflection is accomplished by application of large amplitude negative going voltage pulses to the screen grid electrodes 19R, 19G and 19B. To this end, the screen electrodes 19R, G and B are individually connected through similar coupling capacitors 29 to an output terminal of the voltage pulse source 37. The individual screen electrodes 19R, G and B are further individually connected through similar current limiting resistors 27 to the adjustable sliders of similar potentiometers 31R, G and B, the ends of which are respectively connected to ground and to the positive terminal B++ of a conventional source of boosted direct current voltage. The negative terminal of the B++ voltage source (not shown) is connected to ground in accordance with conventional practice.

The primary windings 45, 55 and 65 of transformers 43, 53 and 63 are respectively connected at one end to ground and to one end of similar background control potentiometers 41, 51 and 61. The other ends of the primary windings 45, 55 and 65 are respectively connected to the adjustable sliders of the respective potentiometers 41, 51 and 61. Positive going voltage pulses are supplied to the ungrounded end of the potentiometers from the pulse generator or pulse source 37 by way of a phase inversion unit 39 which may comprise any one of various phase inverter circuits known to those skilled in the art. The variable amplitude pulse voltage applied to the primary 55 of transformer 53 by way of slider 56 constitutes means for varying the grid leak bias applied to control electrode 17B of the blue gun. Thus, the slider 56 constitutes a blue background control for adjusting the blue content of the composite image formed at the color screen 36 of the cathode ray tube 14. Similarly, the slider 46 constitutes a green background control means for adjusting the green color content of the image formed at screen 36, and potentiometer 61 is a background control means for adjusting the red color content of the image.

The operation of the apparatus of FIG. 1 is substantially as follows. The respective color difference signals R—Y, B—Y and G—Y are applied by way of conductors 24R, B and G, to the control electrodes of the respective electron guns to individually modulate the intensities of the cathode rays produced by the different guns. In accordance with conventional practice, the three modulated electron beams are focussed on different color producing dots of screen 36 to produce different composite colors over the different elemental areas of the screen as the three cathode ray beams are jointly scanned across the screen. At the same time, the monochrome signal Y is applied through conductor 26 to all the cathodes 15 and is added at the respective cathodes to the color difference signals so that the actual modulation signal applied to control electrode 17R, for example, with respect to cathode 15R is a color signal R including both chrominance and luminance information.

As stated heretofore, the internal impedances of the cathodes 15R, 15G and 15B are variable as complex functions of temperature, cathode age and various other factors. The electron beam current flowing through a particular cathode creates a voltage drop across the internal impedance of that cathode, which voltage drop adds to and increases the bias potential applied between the particular cathode and its associated control electrode. The internal impedances of the various cathodes may vary independently and in an unpredictable manner. Accordingly, in the absence of the background control and brightness control circuit arrangements of the present invention, the bias potentials on the various control electrodes with respect to their cathodes, would vary from time to time, causing variations in the black and white balance or the color balance of the image formed at screen 36. That is, if the internal impedance of a particular cathode increased, the bias potential of the associated control electrode would be increased, thereby reducing the intensity of the electron beam produced by that particular gun. As a result, the color saturation corresponding to the intensity of that particular electron beam would be decreased and the color image produced at screen 36 would not be in accordance with the relative magnitudes of the color difference signals as derived from receiver 10.

The present invention overcomes the foregoing difficulty and prevents variation of beam intensity resulting from variation in the internal impedances of the cathodes. The foregoing is accomplished, for example, by application of short duration positive pulses through slider 56 and transformer 53 to the control electrode 17B of the blue gun. The positive pulses produced by secondary winding 57 are translated through coupling capacitor 23 and are applied across resistor 21B to the control electrode 17B. These positive pulses are applied synchronously with the retrace portion of the line scanning waveform applied to deflection yoke 35. Accordingly, the positive pulses thus applied to control electrode 17B do not interfere with the fidelity of the image produced at screen 36 because they occur only during the deflection retrace period when the electron beam is turned off by means of negative pulses applied through capacitor 29B to screen electrode 19B. When one of the aforementioned positive pulses is applied to control electrode 17B, the control electrode is driven positive with respect to the cathode 15B, and a pulse of electron discharge current flows from the cathode 15B to the control electrode 17B. These pulses of discharge current are integrated by capacitor 23B and resistor 21B to produce a direct current bias potential having a magnitude nearly equal to the peak value of the positive pulses induced in winding 57.

Since the absolute potential of the emitting surface of cathode 15B is dependent upon the internal impedance of the cathode, it follows that control electrode 17B will be driven positive with respect to the cathode emitting surface by an amount which decreases as the cathode impedance increases. Accordingly, the average current drawn by grid 17B and flowing through resistor 21B decreases in response to an increase in the cathode impedance, and the self-bias potential applied to control electrode 17B with respect to ground will decrease as the internal impedance of the cathode increases. Thus, it is clear that the bias potential maintained at control electrode 17B with respect to the emitting surface of cathode 15B is automatically adjusted to compensate for variations in the internal impedance of the cathode and the average intensity of the blue color producing electron beam is thereby maintained substantially constant. The self-biasing circuits for the red and green electron guns operate in identically the same manner as heretofore described with respect to the bias circuit for the blue gun.

In FIGURE 2 there is shown an image reproducing system in accordance with the invention which is in most respects similar to the system of FIGURE 1. In the system of FIGURE 2 the background control means comprises a pulse source 37' in the form of an auxiliary winding 73 of the horizontal flyback transformer of unit 33. A plurality of background control potentiometers 41', 51' and 61' are connected in parallel across the pulse source 37' and have adjustable taps, which taps are respectively connected through load resistors 71G, 71B and 71R to the color signal conductors 24G, B and R. As shown in FIGURE 2, the load resistors 71R, B and G are connected respectively to the anodes of the conventional color difference synchronous demodulators in the receiver 10. The lower ends of the parallel connected background control potentiometers 41', 51' and 61' are connected directly to B+ so that energizing voltage is supplied to the demodulator anodes through the respective potentiometers and the load resistors 71R, G and B. It will be apparent to persons skilled in the art that the resistance coupled background control network of FIGURE 2 supplies positive going voltage pulses through coupling capacitors 23R, B and G to the grids of the respective electron guns. Accordingly the system of FIG. 2 operates in substantially the same manner as heretofore described with reference to FIG. 1. The system of FIG. 2 may be comparatively more desirable in certain applications in that it eliminates the need for the pulse transformers 43, 53 and 63 of FIG. 1. It is to be understood of course that auxiliary flyback winding 73 is connected to the potentiometers 41', 51' and 61' with a first polarity, while winding 75 of source 37 is oppositely polarized so that positive going flyback pulses are applied to grid 17R, for example, in synchronism with negative going pulses at cathode 15R and screen grid 19R.

Blanking of the electron guns during the horizontal sweep retrace interval and brightness stabilization is accomplished by flyback transformer winding 75, brightness control potentiometer 60 and the associated network for coupling negative pulses to the screen grids 19 and cathodes 15. This brightness control arrangement is similar to the corresponding circuit of FIG. 1. Negative voltage pulses from winding 75 are applied through potentiometer 60, video load resistor 66, and capacitor 70 in time coincidence with the sync pedestal portion or so-called blacker-than-black portion of the monochrome signal as applied from the video amplifier by way of conductor 26. The negative going pulses combine with the luminance signal pedestal to drive the cathodes 15 negative relative to the control grids 17 thereby causing grid current which is averaged by capacitors 23 and 70 to maintain a stable bias on the electron guns. The brightness control bias thus provided depends upon (1) the absolute level of the video sync pedestal and, (2) the setting of brightness control resistor 60. It is entirely independent of picture content and is unaffected by variations in the average peak-to-peak amplitude of the monochrome signal. In effect, the luminance signal Y as applied between cathodes 15 and grids 17 is clamped at a constant reference level as determined by the constant peak to peak amplitude of the carrier wave during the horizontal retrace interval. Thus the brightness stabilization and brightness control circuit provides absolute D.C. restoration of the luminance signal (i.e. 100% transmission of the direct current component of the video signal from the video detector to the cathode ray tube input circuit). Persons skilled in the television art will recognize that this feature of the invention provides improved quality in the reproduced picture with great economy of circuitry and structure.

In FIG. 3 is shown an alternative embodiment of the present invention, similar to that of FIG. 2, but differing in that the background control or color balance control network 76 is connected between the cathodes 15 and ground rather than in the grid circuits as in FIGS. 1 and 2. Connected serially with background control potentiometers 77 and 79 are a cathode resistor 80 and an auxiliary winding 78 of the horizontal flyback transformer. The winding 78 is poled so as to apply negative going pulses to the cathodes 15 relative to ground. Such negative pulses applied through adjustable resistors 77 and 79 have substantially the same grid current inducing effect as the positive going pulses applied to the respective grids in the systems of FIGURES 1 and 2. As described heretofore the synchronously pulsed background control network 76 provides automatic compensation for differential changes in the cathode impedance and thereby provides automatic stabilization of black and white balance for either monochrome or color picture reproduction as well as providing substantially improved color balance over the entire range of picture brightness fluctuation.

Thus, the present invention provides circuit means coupled between a source of voltage pulses and the control-electrode-to-cathode circuits of the cathode ray forming electron guns of a cathode ray picture tube for repetitively applying voltage pulses to drive the control electrodes positive with respect to the cathodes. As a result, electron current is drawn by each of the control electrodes in an average amount which varies as an inverse function of the internal impedance of the associated cathode. The currents thus drawn by the control electrodes are applied to an integrating bias circuit means to produce an automatically adjusted bias potential at each control electrode which bias potential is dependent upon the inherent internal impedance of the cathode associated with each control electrode.

While the invention has been described with reference to a color image reproducing system including a cathode ray tube having three electron guns, it should be understood that it is not limited to such a particular system. The broad concepts of the invention may be utilized in any electronic system or apparatus wherein a plurality of cathode ray beam forming electron discharge devices are used to jointly produce an output signal or function which is dependent upon the combined electron currents of the plurality of discharge devices.

While the present invention has been shown in certain preferred embodiments only, it will be obvious to those skilled in the art that it is not so limited but is susceptible of various changes and modification without departing from the spirit and scope thereof.

We claim as our invention:

1. A receiving system for producing color television images defined by a composite signal including a monochrome intelligence component, a synchronizing signal component, and a plurality of chromaticity intelligence components; said receiving system comprising a tri-color cathode ray tube including first, second and third cathode-ray producing electron guns each having at least a cathode, and first and second control electrodes; means for cyclically deflecting the cathode rays produced by said guns, circuit means for individually deriving said chromaticity components from said composite signal and individually applying different ones of said chromaticity components to the control electrode-cathode circuits of said first, second and third electron guns; circuit means for deriving and applying said monochrome component to the cathodes of all said guns; pulse generator means for producing recurrent voltage pulses of a repetition frequency corresponding to that of said synchronizing component, blanking circuit means coupled between said pulse generator means and all said second control electrodes for periodically applying negative going blanking pulses to said second control electrodes in synchronism with the retrace portion of said cyclical cathode ray deflection; circuit means coupled between said pulse generator means and the control electrode-cathode circuits of at least two of said guns for repetitively applying voltage pulses thereto to drive said control electrodes positive with respect to said cathodes so that electron discharge currents flow from said cathodes to said control electrodes in proportion to the respective internal impedances of said cathodes, and bias circuit means connected to the control electrodes of said two guns for integrating said periodic electron discharge currents to provide bias potentials respectively dependent upon the impedances of said cathodes.

2. In a television receiver for reproducing color images; circuit means for separately supplying a plurality of chromaticity signals; a color image reproducing device including a plurality of electron beam producing guns each having at least first, second and third electrodes; means for applying each of said chromaticity signals separately to a corresponding pair of said electrodes in each of said guns for controlling the individual intensities of said electron beams; biasing means including a source of voltage pulses and circuit means coupled between said source and one electrode of said pair of electrodes in one of said guns for repetitively applying first voltage pulses between the electrodes of said pair to induce a flow of electrons therebetween with the magnitude of said flow being a function of the internal impedance of the electrodes of said pair, whereby the average bias potential of said second electrode relative to said first electrode is dependent upon said internal impedance; blanking circuit means coupled to said source and to at least one of said first and third electrodes in said one gun for applying second voltage pulses thereto coincidently with application of said first voltage pulses to said pair of electrodes so that electron flow between said first and third electrodes is substantially prohibited during the time intervals of said first voltage pulses.

3. In a television receiver for reproducing color images in response to a composite video signal including a plurality of chromaticity components; a color image reproducing device including a plurality of electron beam producing guns each having at least first, second and third electrodes with said first and second electrodes comprising a control signal input pair; means applying a separate one of said chromaticity components to the signal input pair of electrodes of each of said guns for individually controlling the intensities of said electron beams; biasing means including a source of voltage pulses and circuit means coupled between said source and one electrode of said pair of electrodes in one of said guns for repetitively applying first voltage pulses between the electrodes of said pair to induce a flow of electrons therebetween with the magnitude of said flow being a function of the internal impedance of the electrodes of said pair, whereby the average bias potential of said second electrode relative to said first electrode is dependent upon said internal impedance; blanking circuit means coupled to said source and to at least one of said first and third electrodes in said one gun for applying second voltage pulses thereto coincidently with application of said first voltage pulses to said pair of electrodes so that electron flow between said first and third electrodes is substantially prohibited during the time intervals of said first voltage pulses.

4. In a television receiver for reproducing color images; circuit means for supplying a plurality of video signals including chromaticity signals; a plurality of synchronous demodulators coupled to said circuit means for individually producing different color signals; a color image reproducing device including a plurality of electron beam producing guns each having at least first, second and third electrodes; means coupling a pair of said electrodes in each of said guns to a different respective one of said demodulators for controlling the intensities of said electron beams to develop different color images in response to said different color signals; biasing means including a source of voltage pulses and circuit means coupled between said source and one electrode of said pair of electrodes in one of said guns for repetitively applying first voltage pulses between the electrodes of said pair to induce a flow of electrons therebetween with the magnitude of said flow being a function of the internal impedance of the electrodes of said pair, whereby the average bias potential of said second electrode relative to said first electrode is dependent upon said internal impedance; blanking circuit means coupled to said source and to at least one of said first and third electrodes in said one gun for applying second voltage pulses thereto coincidently with application of said first voltage pulses to said pair of electrodes so that electron flow between said first and third electrodes is substantially prohibited during the time intervals of said first voltage pulses.

5. In a television receiver for reproducing color images in response to a composite video signal including a synchronizing component and a plurality of chromaticity components; means for providing said composite signal; a plurality of synchronous demodulators coupled to said last mentioned means for producing separate color difference signals; a color image reproducing device including a plurality of electron beam producing guns each having at least first, second and third electrodes; means coupling a pair of said electrodes in each of said guns to a different respective one of said demodulators for controlling the intensities of said electron beams to develop and combine different color images in response to said separate color difference signals; biasing means including a source of voltage pulses of a frequency corresponding to that of said synchronizing component and circuit means coupled between said source and one electrode of said pair of electrodes in one of said guns for repetitively applying positive voltage pulses between the electrodes of said pair to induce a flow of electrons therebetween with the magnitude of said flow being a function of the internal impedance of the electrodes of said pair so that the average bias potential of said second electrode relative to said first electrode is dependent upon said internal impedance; blanking circuit means coupled to said source and to at least one of said first and third electrodes in at least two of said guns for applying negative voltage pulses thereto coincidentally with application of said positive voltage pulses to said pair of electrodes so that electron flow between said first and third electrodes is substantially prohibited during the time intervals of said positive voltage pulses.

6. In a color-television receiver for reproducing color images; circuit means for separately supplying a plurality of color difference signals; color image reproducing means including a plurality of electron guns each having at least first, second and third electrodes with said first and second electrodes comprising a control signal input pair, means applying a separate one of said color difference signals to the singnal input pair of electrodes of each of said guns for individually controlling said electron guns to produce different color images; biasing means including a source of voltage pulses and grid leak circuit means coupled to said source and to said pair of electrodes in one of said guns for recurrently applying first voltage pulses between the electrodes of said pair to induce a flow of electrons therebetween with the magnitude of said flow being dependent upon the inherent impedance of the electrodes of said first pair, and blanking circuit means coupled to said source and to a second pair of the electrodes in said one gun for recurrently applying second voltage pulses thereto in time coincidence with application of said first voltage pulses to said first pair whereby electron flow between the electrodes of said second pair is substantially prohibited during the time intervals of said first voltage pulses.

7. In combination with a cathode ray tube having a plurality of cathode ray beam forming electron guns each including first and second electrodes; means for applying intelligence signals between said electrodes of each of said guns; beam intensity control means including a source of variable amplitude voltage pulses, means coupled to said source for applying said voltage pulses to the first electrode of each of said guns to induce pulsatory current flow between said first and second electrodes with the magnitude of said flow being dependent upon the amplitude of said pulses, and an integrating circuit connected between said electrodes of each of said guns for applying a direct current bias potential between said electrodes corresponding to the average magnitude of said current flow.

8. In a television receiver for reproducing color images in response to a composite video signal including a synchronizing component and a plurality of chromaticity components; means for providing said composite signal; a plurality of synchronous demodulators coupled to said last mentioned means for producing separate color difference signals; a color image reproducing device including a plurality of electron beam producing guns each having at least first, second and third electrodes; means coupling a different respective one of said demodulators to a pair of said electrodes in each of said guns for controlling the instantaneous intensities of said electron beams in response to said color difference signals; average image brightness control means including a source of periodically recurrent voltage pulses of a frequency and phase corresponding to that of said synchronizing component, circuit means coupling said source between said first electrodes and a point of reference potential, integration means connected between each of said second electrodes and said point of reference potential for individually maintaining said second electrodes at bias potential levels corresponding to the average electron discharge current flow thereto and means coupled to said source for adjusting the amplitude of said voltage pulses whereby the average bias potentials of said second electrodes relative to said first electrodes are controlled to determine the average intensities of said electron beams.

References Cited in the file of this patent

UNITED STATES PATENTS

| | | |
|---|---|---|
| 2,835,573 | Macovski | July 29, 1958 |
| 2,935,556 | Barco | May 3, 1960 |

FOREIGN PATENTS

| | | |
|---|---|---|
| 155,233 | Australia | Feb. 12, 1954 |